(12) United States Patent
Ryu et al.

(10) Patent No.: US 7,209,300 B2
(45) Date of Patent: Apr. 24, 2007

(54) WIDE-ANGLE LENS SYSTEM

(75) Inventors: Sachiko Ryu, Kanagawa (JP);
Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 11/302,163

(22) Filed: Dec. 14, 2005

(65) Prior Publication Data

US 2006/0126192 A1    Jun. 15, 2006

(30) Foreign Application Priority Data

Dec. 15, 2004   (JP)   ............... 2004-362841

(51) Int. Cl.
    G02B 13/04   (2006.01)
    G02B 9/04    (2006.01)
(52) U.S. Cl. ................ 359/753; 359/749; 359/793
(58) Field of Classification Search ........... 359/749, 359/751, 752, 753, 793, 794
    See application file for complete search history.

(56) References Cited

U.S. PATENT DOCUMENTS

| | | | |
|---|---|---|---|
| 5,315,441 A | | 5/1994 | Hori et al. |
| 5,321,554 A | * | 6/1994 | Ishiyama et al. ........... 359/753 |
| 5,477,388 A | * | 12/1995 | Ishiyama et al. ........... 359/749 |
| 5,477,389 A | | 12/1995 | Ito et al. |
| 5,513,045 A | * | 4/1996 | Ito et al. .................... 359/750 |
| 5,625,497 A | * | 4/1997 | Emomoto ................... 359/751 |
| 5,684,643 A | | 11/1997 | Enomoto et al. |
| 5,706,141 A | * | 1/1998 | Abe ........................... 359/793 |
| 5,724,195 A | | 3/1998 | Enomoto et al. |
| 5,861,999 A | | 1/1999 | Tada |
| 5,877,901 A | | 3/1999 | Enomoto et al. |

FOREIGN PATENT DOCUMENTS

| | | |
|---|---|---|
| JP | 4-011209 | 1/1992 |
| JP | 5-188294 | 7/1993 |
| JP | 7-063986 | 3/1995 |
| JP | 9-127413 | 5/1997 |
| JP | 2001-208967 | 8/2001 |

OTHER PUBLICATIONS

English Language Abstract of JP 5-188294.
English Language Abstract of JP 7-063986.
English Language Abstract of JP 9-127413.
English Language Abstract of JP 2001-208967.

* cited by examiner

*Primary Examiner*—David N. Spector
(74) *Attorney, Agent, or Firm*—Greenblum & Bernstein, P.L.C.

(57) ABSTRACT

A wide-angle lens system includes a positive front lens group, a diaphragm, and a positive rear lens group. The front lens group includes a negative first-sub-lens group and a positive second-sub-lens group.

The negative first-sub-lens group includes a negative lens element, a positive lens element, and a negative lens element.

The front lens group satisfies the following conditions:

$$0.5 < f/|f_{1a}| < 0.75 \quad (1)$$

$$0.5 < |f_{1a}|/f_{1b} < 1.0 \quad (2)$$

$$0.35 < f/f_{1bi} < 0.6 \quad (3)$$

wherein f: the focal length of the entire lens system; $f_{1a}$: the focal length of the negative first-sub-lens group; $f_{1b}$: the focal length of the positive second-sub-lens group; $f_{1bi}$: the focal length of the most image-side surface of the positive second-sub-lens group; $r_{1bi}$: the radius of curvature of the most image-side surface of the positive second-sub-lens group; and $N_{1bi}$: a refractive index of the most image-side lens element of the positive second-sub-lens group.

4 Claims, 6 Drawing Sheets

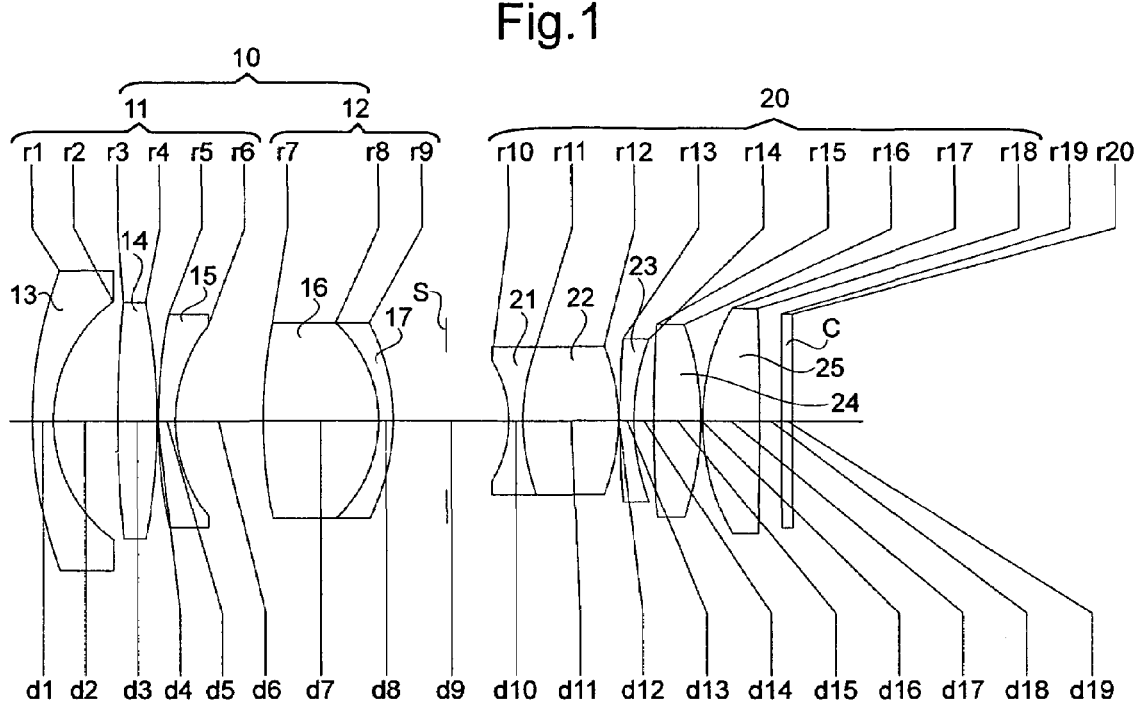

FNO=1:1.4

—— SA
- - SC

-0.1   0.1

SPHERICAL
ABERRATION

THE SINE
CONDITION

FNO=1:1.4

—— d Line
······· g Line
- - - C Line

-0.1   0.1

SPHERICAL
ABERRATION

CHROMATIC
ABERRATION y=5.95°

-0.02   0.02

LATERAL
CHROMATIC
ABERRATION y=5.95°

—— S
- - M

-0.1   0.1

ASTIGMATISM y=5.95°

-2.0 (%) 2.0

DISTORTION

Fig.5
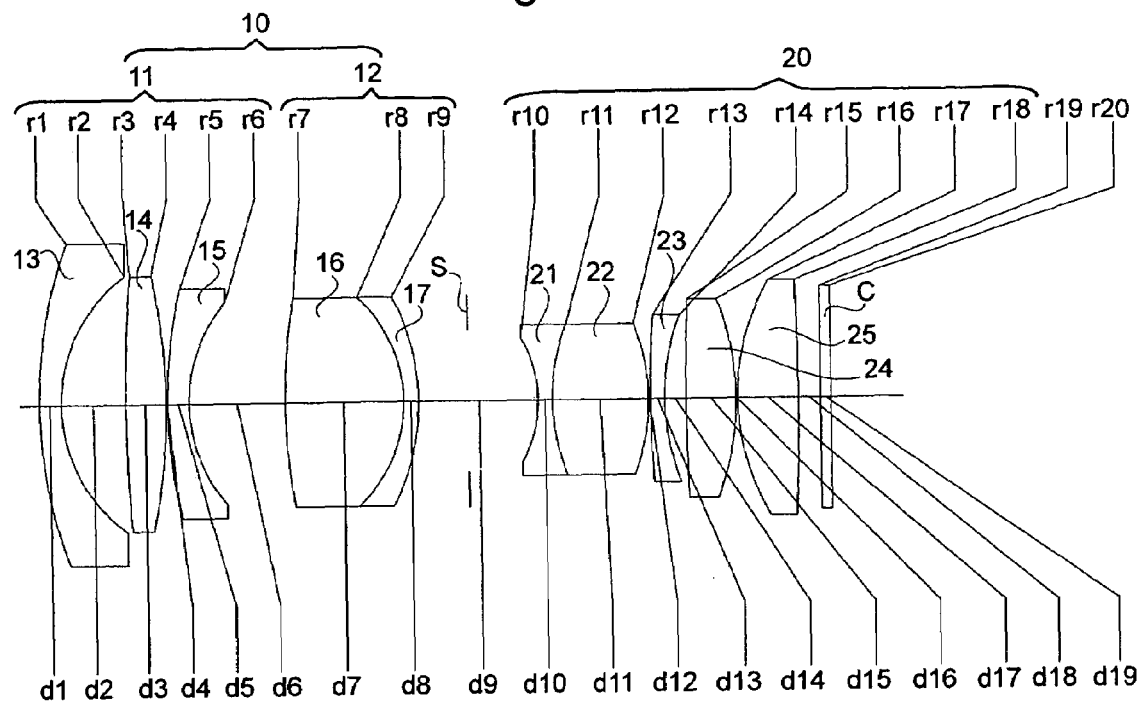
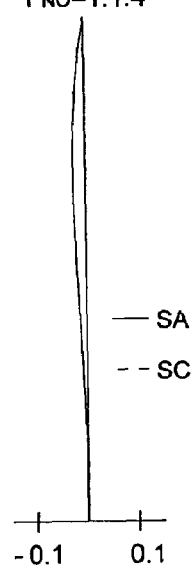
Fig.6A
FNO=1:1.4
— SA
- - SC
-0.1  0.1
SPHERICAL
ABERRATION
THE SINE
CONDITION
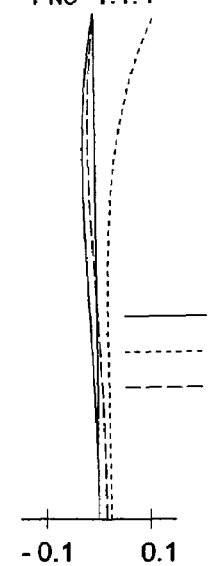
Fig.6B
FNO=1:1.4
— d Line
······ g Line
- - - C Line
-0.1  0.1
SPHERICAL
ABERRATION
CHROMATIC
ABERRATION
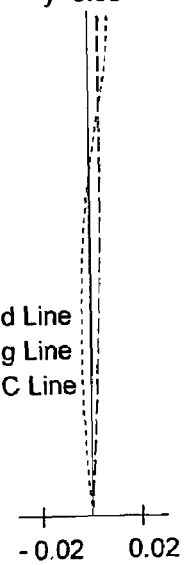
Fig.6C
y=5.95°
-0.02  0.02
LATERAL
CHROMATIC
ABERRATION
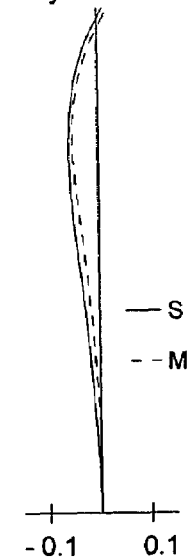
Fig.6D
y=5.95°
— S
- - M
-0.1  0.1
ASTIGMATISM
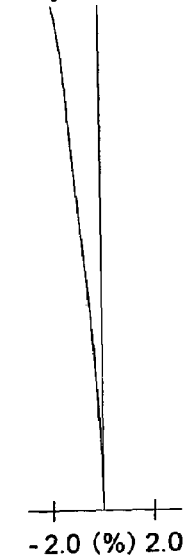
Fig.6E
y=5.95°
-2.0 (%) 2.0
DISTORTION

F_NO=1:1.4

—— SA
- - SC

-0.1  0.1
SPHERICAL
ABERRATION

THE SINE
CONDITION

F_NO=1:1.4

—— d Line
······ g Line
---- C Line

-0.1  0.1
SPHERICAL
ABERRATION

CHROMATIC
ABERRATION y=5.95°

-0.02  0.02
LATERAL
CHROMATIC
ABERRATION y=5.95°

—— S
- - M

-0.1  0.1
ASTIGMATISM y=5.95°

-2.0 (%) 2.0
DISTORTION

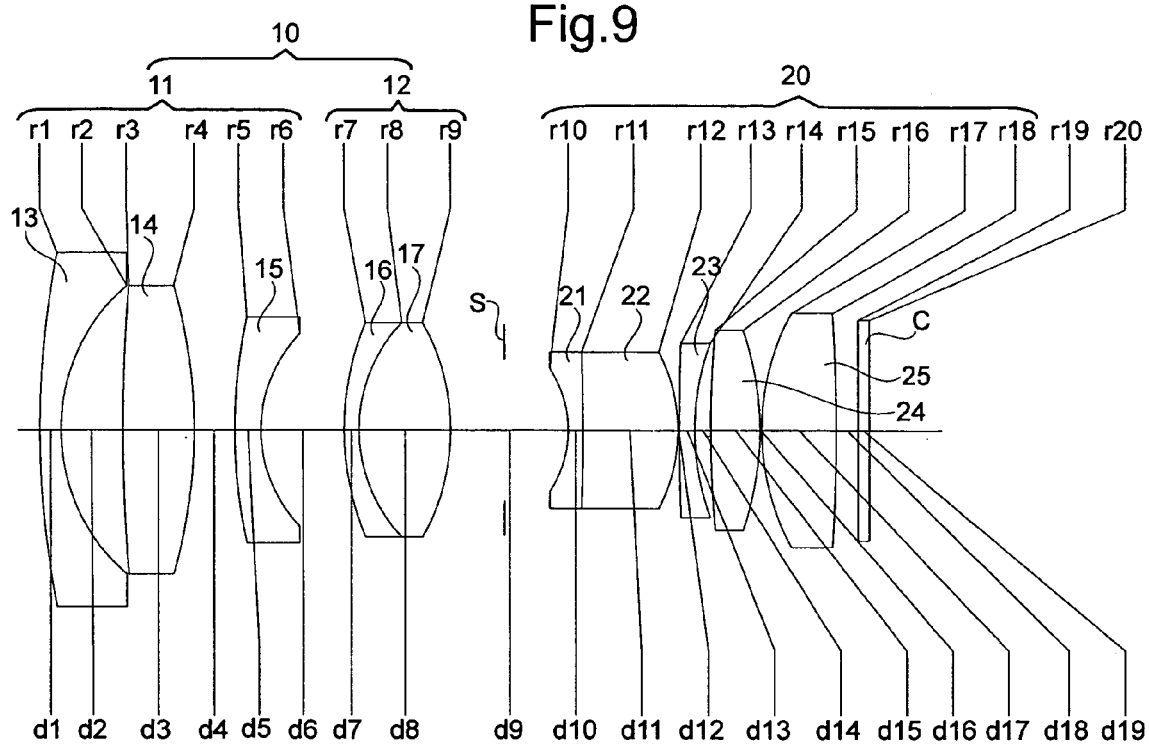
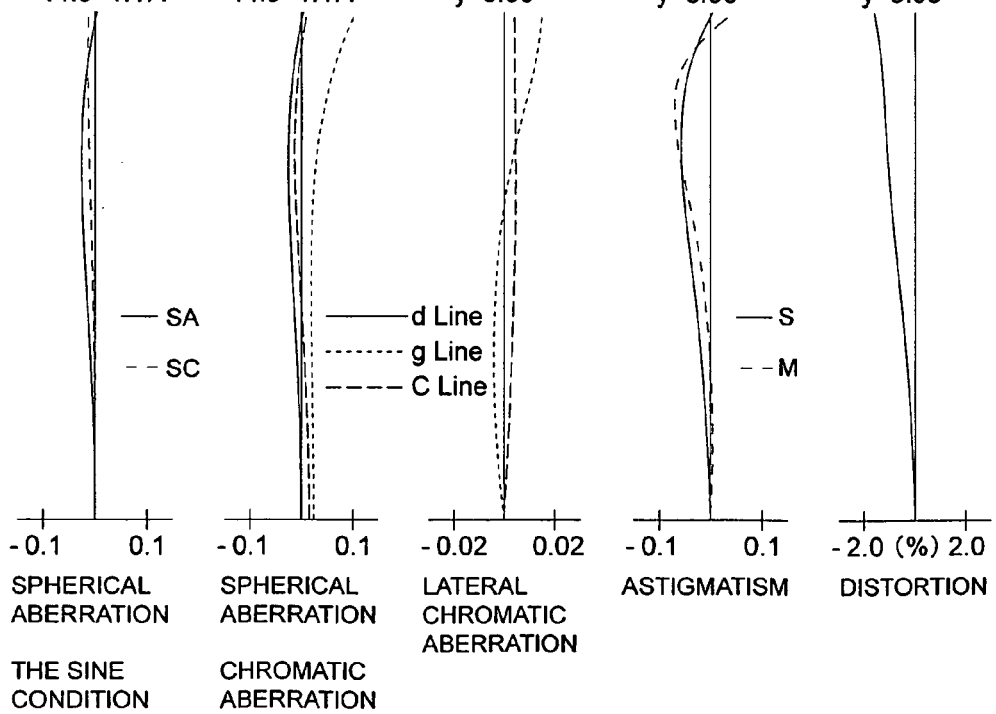

Fig.11
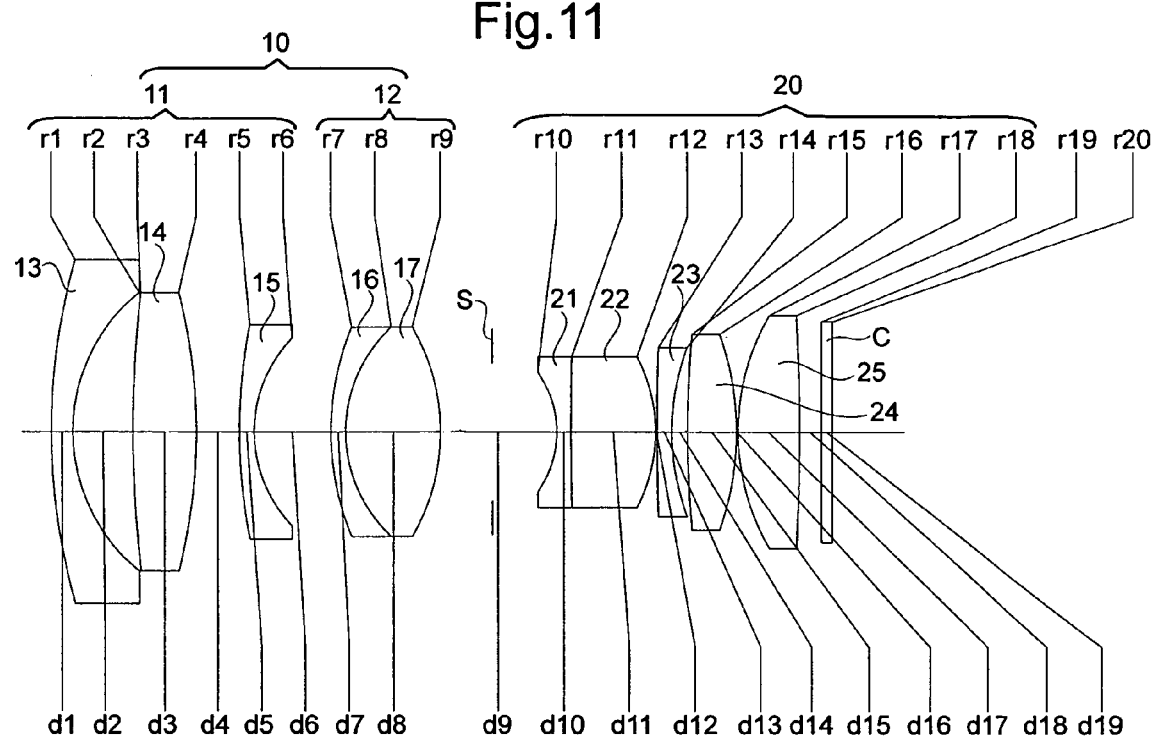
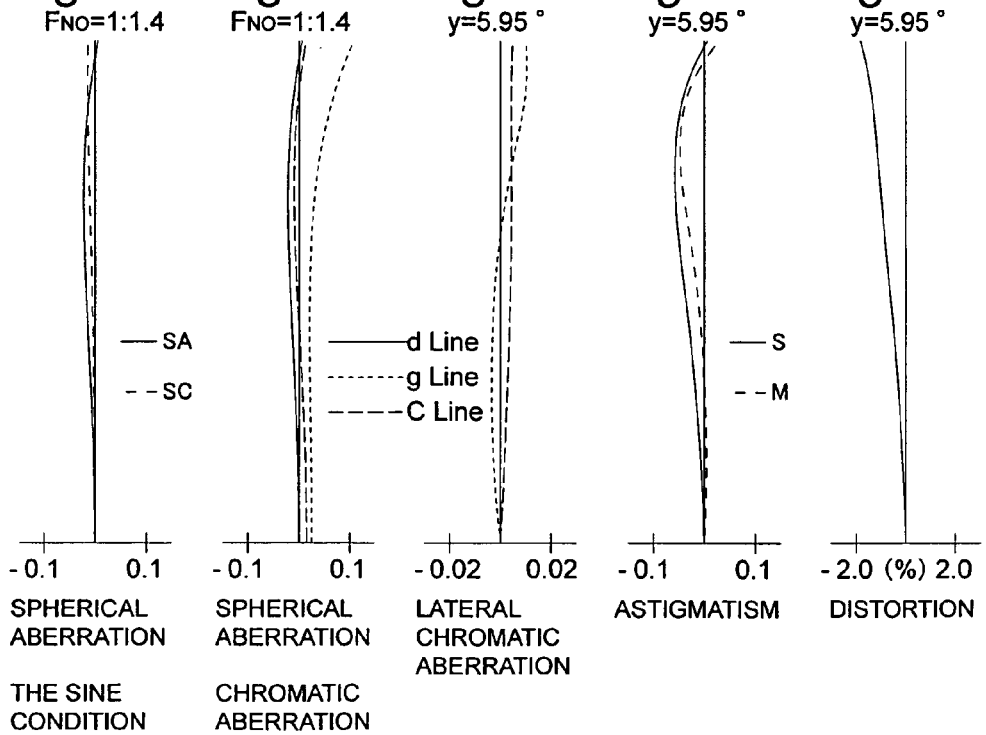
Fig.12A  Fig.12B  Fig.12C  Fig.12D  Fig.12E

WIDE-ANGLE LENS SYSTEM

BACKGROUND OF THE INVENTION

1. Field of the Invention

The present invention relates to a wide-angle lens system for examining an object at a finite distance with high definition, and for use in processing an object image.

2. Description of the Prior Art

In the prior art, wide-angle lens systems for surveillance cameras have been disclosed in, e.g., Japanese Unexamined Patent Publication (hereinafter, JUPP) No. 2001-208967, JUPP No.H09-127413, JUPP No.H07-63986, and JUPP No.H04-11209.

However, in the wide-angle lens system disclosed in each of these publications, distortion is noticeable, and such a wide-angle lens system cannot be used for image processing in which the optical ability with a higher definition is required. Furthermore, the overall length of the wide-angle lens system disclosed in these publications is relatively long compared to the focal length.

On the other hand, there has been a wide-angle lens system which is designed for photographing purpose. This type of wide-angle lens system is disclosed in, e.g., Japanese Unexamined Patent Publication No. H05-188294; however, the amount of peripheral illumination is smaller. If an attempt is made to increase the amount of peripheral illumination, coma of higher order occurs. Consequently, the optical performance with higher definition cannot be attained, and hence such a wide-angle lens system cannot be used for image processing.

SUMMARY OF THE INVENTION

The present invention provides a wide-angle lens system which can be used for examining an object at a finite distance with higher definition, and for image processing.

According to an aspect of the present invention, there is provided a wide-angle lens system including a front lens group having a positive refractive power (hereinafter, a positive front lens group), a diaphragm, and a rear lens group having a positive refractive power (hereinafter, a positive rear lens group), in this order from the object.

The front lens group includes a negative first-sub-lens group and a positive second-sub-lens group, in this order from the object.

The negative first-sub-lens group includes a negative lens element, a positive lens element, and a negative lens element, in this order from the object.

The positive front lens group satisfies the following conditions:

$$0.5 < f/|f_{1a}| < 0.75 \quad (1)$$

$$0.5 < |f_{1a}|/f_{1b} < 1.0 \quad (2)$$

$$0.35 < f/f_{1bi} < 0.6 \quad (3)$$

wherein f designates the focal length of the entire lens system;

$f_{1a}$ designates the focal length of the negative first-sub-lens group ($f_{1a} < 0$);

$f_{1b}$ designates the focal length of the positive second-sub-lens group ($f_{1b} > 0$);

$r_{1bi}$ designates the radius of curvature of the most image-side surface of the positive second-sub-lens group ($r_{1bi} < 0$)

$N_{1bi}$ designates a refractive index of the most image-side lens element of the positive second-sub-lens group; and $f_{1bi}$ designates the focal length of the most image-side surface (the surface refractive power) of the positive second-sub-lens group ($f_{1bi} = r_{1bi}/(1 - N_{1bi})$).

The wide-angle lens system preferably satisfies the following condition:

$$1.7 < d_{1a-1b}/f < 3.0 \quad (4)$$

wherein $d_{1a-1b}$ designates the distance from the most object-side surface of the negative first-sub-lens group to the most object-side surface of the positive second-sub-lens group; and f designates the focal length of the entire lens system.

The positive second-sub-lens group preferably includes a positive lens element and a negative lens element, or, a negative lens element and a positive lens element, which are cemented to each other, in this order from the object; and the positive second-sub-lens group preferably satisfies the following conditions:

$$0.25 < |f_{1bp}/f_{1bn}| < 0.5 \quad (5)$$

$$10 < v_{1bp} - v_{1bn} < 30 \quad (6)$$

wherein $f_{1bp}$ designates the focal length of the positive lens element in the positive second-sub-lens group;

$f_{1bn}$ designates the focal length of the negative lens element in the positive second-sub-lens group;

$v_{1bp}$ designates the Abbe number of the positive lens element in the positive second-sub-lens group; and $v_{1bn}$ designates the Abbe number of the negative lens element in the positive second-sub-lens group.

In the wide-angle lens system of the present invention, it is practical to perform focusing by advancing the entire lens system.

The present disclosure relates to subject matter contained in Japanese Patent Application No. 2004-362841 (filed on Dec. 15, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the wide-angle lens system according to a first embodiment of the present invention;

FIGS. 2A, 2B, 2C, 2D and 2E show aberrations occurred in the lens arrangement shown in FIG. 1;

FIG. 5 is a lens arrangement of the wide-angle lens system according to a third embodiment of the present invention;

FIGS. 6A, 6B, 6C, 6D and 6E show aberrations occurred in the lens arrangement shown in FIG. 5;

FIG. 9 is a lens arrangement of the wide-angle lens system according to a fifth embodiment of the present invention;

FIGS. 10A, 10B, 10C, 10D and 10E show aberrations occurred in the lens arrangement shown in FIG. 9;

FIG. 11 is a lens arrangement of the wide-angle lens system according to a sixth embodiment of the present invention; and FIGS. 12A, 12B, 12C, 12D and 12E show aberrations occurred in the lens arrangement shown in FIG. 11.

DESCRIPTION OF THE PREFERRED EMBODIMENTS

Figure 3:
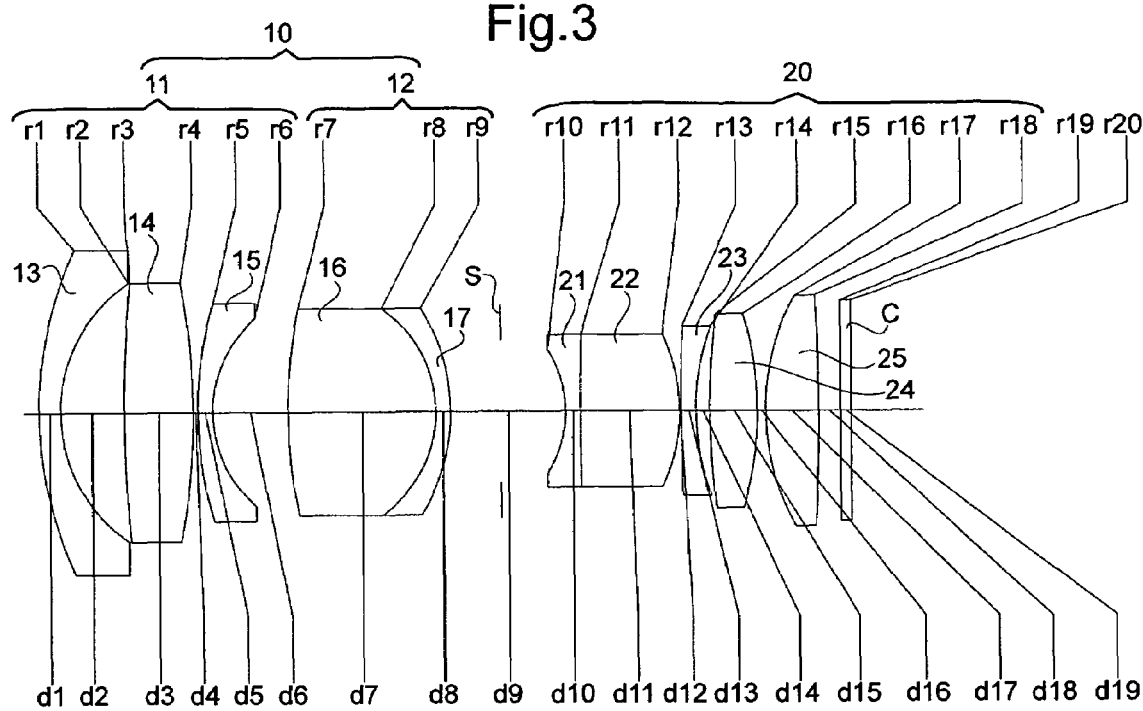
FIG. 3 is a lens arrangement of the wide-angle lens system according to a second embodiment of the present invention.
Figure 4A:
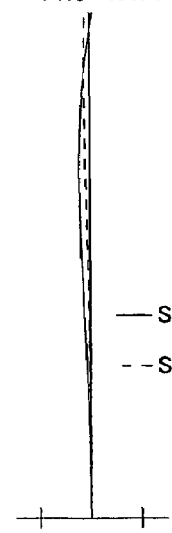
FIGS. 4A, 4B, 4C, 4D and 4E show aberrations occurred in the lens arrangement shown in FIG. 3.
Figure 4B:
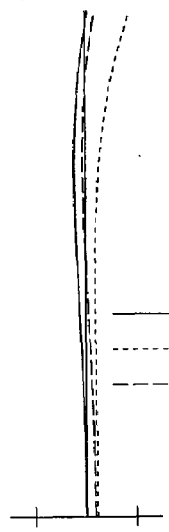
Figure 4C:
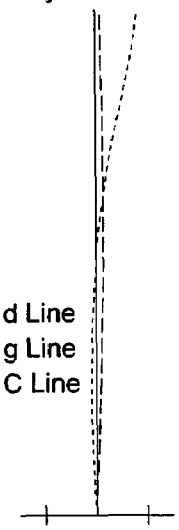
Figure 4D:
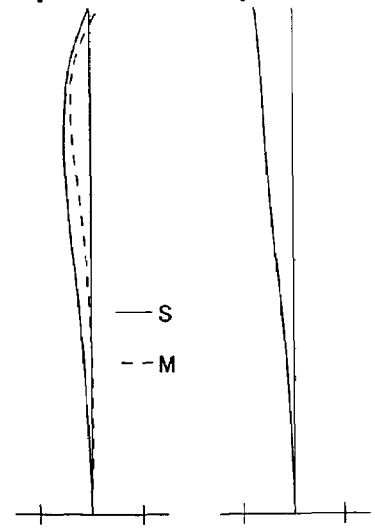
Figure 4E:
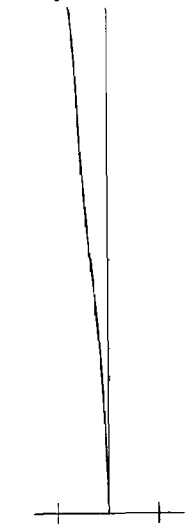

The wide-angle lens system of the present invention, as shown in FIGS. 1, 3, 5, 7, 9 and 11 (the first to sixth embodiments), includes a positive front lens group 10, a diaphragm S, and a positive rear lens group 20, in this order from the object.

The positive front lens group 10 includes a negative first-sub-lens group 11 and a positive second-sub-lens group 12, in this order from the object.

The negative first-sub-lens group 11 includes a negative meniscus lens element 13 having the convex surface facing toward the object, a positive lens element 14 and a negative meniscus lens element 15 having the convex surface facing toward the object, in this order from the object.

The positive second-sub-lens group 12 includes two lens elements 16 and 17, which are cemented to each other, in this order from the object.

More specifically, in the first to third embodiments, the positive second-sub-lens group 12 includes a positive lens element 16 and a negative lens element 17, which are cemented to each other, in this order from the object.

In the fourth to sixth embodiments, the positive second-sub-lens group 12 includes a negative lens element 16 and a positive lens element 17, which are cemented to each other, in this order from the object.

The positive rear lens group 20 includes a biconcave negative lens element 21 and a positive lens element 22 which are cemented to each other, a negative lens element 23, a positive lens element 24 and a positive lens element 25, in this order from the object.

A cover glass (filter group) C is provided in front of a CCD (imaging device) provided behind the positive rear lens group 20.

Focusing from an infinite object distance to a finite object distance is performed by advancing the entire lens system.

Condition (1) relates to the focal length (i.e., the refractive power) of the negative first-sub-lens group 11 provided on the object side in the positive front lens group 10.

If $f/|f_{1a}|$ exceeds the upper limit of condition (1), the negative refractive power of the negative first-sub-lens group 11 becomes too strong. Consequently, coma of higher order occurs, so that the optical performance with higher definition cannot be attained.

If $f/|f_{1a}|$ exceeds the lower limit of condition (1), it becomes difficult to make the back focal distance longer, and spherical aberration becomes undercorrected.

Condition (2) specifies the ratio of the focal length (i.e., the refractive power) of the negative first-sub-lens group 11 to that of the positive second-sub-lens group 12.

If $|f_{1a}|/f_{1b}$ exceeds the upper limit of condition (2), the positive refractive power of the positive second-sub-lens group 12 becomes too strong, with respect to the negative refractive power of the negative first-sub-lens group 11. Accordingly, if an attempt is made to increase the amount of peripheral illumination, coma of higher order inevitably increases.

If $|f_{1a}|/f_{1b}$ exceeds the lower limit of condition (2), the positive refractive power of the positive second-sub-lens group 12 becomes too weak. Consequently, the correcting of distortion becomes difficult.

Condition (3) relates to the focal length (the surface refractive power) of the most image-side surface of the positive second-sub-lens group 12.

The most image-side surface of the positive second-sub-lens group 12 has a positive focal length ($f_{1bi}>0$), and is formed as a convex surface facing towards the image.

It is preferable that the positive second-sub-lens group 12 be constituted by a positive lens element and a negative lens element, or, a negative lens element and a positive lens element, which are cemented to each other, in this order from the object. Furthermore, in the case of cemented lens elements, it is preferable that the curvature of the image-side surface be larger (i.e., a smaller radius of curvature) than that of the object-side surface.

If $f/f_{1bi}$ exceeds the upper limit of condition (3), the surface refractive power of the most image-side surface of the positive second-sub-lens group 12 becomes too strong. Consequently, coma of higher order and distortion of higher order occur, and the optical performance with higher definition cannot be attained.

If $f/f_{1bi}$ exceeds the lower limit of condition (3), the correcting of distortion becomes difficult.

Condition (4) specifies the distance from the most object-side surface of the negative first-sub-lens group 11 to the most object-side surface of the positive second-sub-lens group 12.

If $d_{1a-1b}/f$ exceeds the upper limit of condition (4), it is advantageous to make the back focal distance longer; however, the positive refractive power of the positive second-sub-lens group 12 has to be made stronger. As a result, the correcting of spherical aberration occurred in the positive second-sub-lens group 12 becomes difficult.

If $d_{1a-1b}/f$ exceeds the lower limit of condition (4), the correcting of distortion by the negative first-sub-lens group 11 becomes difficult.

Conditions (5) and (6) specify the two lens elements 16 and 17 constituting the positive second-sub-lens group 12. Namely, the positive second-sub-lens group 12 includes a positive lens element 16 and a negative lens element 17, or, a negative lens element 16 and a positive lens element 17, which are cemented to each other, in this order from the object.

Condition (5) specifies the ratio of the focal length of the positive lens element (16 or 17) to that of the negative lens element (17 or 16) in the positive second-sub-lens group 12.

If $f_{1bp}/|f_{1bn}|$ exceeds the upper limit of condition (5), the negative refractive power of the negative lens element (17 or 16) becomes too strong, coma of higher order occurs, and lateral chromatic aberration is overcorrected.

If $f_{1bp}/|f_{1bn}|$ exceeds the lower limit of condition (5), the negative refractive power of the negative lens element (17 or 16) becomes too weak, the correcting of lateral chromatic aberration becomes difficult, and the optical performance with higher definition cannot be attained.

Condition (6) specifies the Abbe number of the positive lens element (16 or 17) and that of the negative lens element (17 or 16) in the positive second-sub-lens group 12.

If $v_{1bp}-v_{1bn}$ exceeds the upper limit of condition (6), lateral chromatic aberration becomes overcorrected.

If $v_{bp}-v_{1bn}$ exceeds the lower limit of condition (6), the correcting of lateral chromatic aberration becomes difficult.

Specific numerical data of the embodiments will be described hereinafter.

In the diagrams of spherical aberration and the sine condition at the f-number of 1:1.4, SA designates spherical aberration, and SC designates the sine condition.

In the diagrams of chromatic aberration (axial chromatic aberration) represented by spherical aberration at the f-number of 1:1.4, the solid line and the two types of dotted lines respectively indicate spherical aberrations with respect to the d, g and C lines.

In the diagrams of lateral chromatic aberration at the image height of 5.95, the two types of dotted lines respectively indicate magnification with respect to the g and C lines; however, the d line as the base line coincides with the ordinate.

In the diagrams of astigmatism at the image height of 5.95, S designates the sagittal image, and M designates the meridional image.

In the diagrams of distortion, distortion at the image height of 5.95 is shown.

The tables, F designates the f-number, f designates the focal length of the entire lens system, m designates the lateral magnification; fB designates the back focal distance, OD designates the object distance, r designates the radius of curvature, d designates the lens-element thickness or distance between lens elements, $N_d$ designates the refractive index of the d-line, and ν designates the Abbe number.

[Embodiment 1]

FIG. 1 is the lens arrangement of the wide-angle lens system according to the first embodiment of the present invention. FIGS. 2A through 2E show aberrations occurred in the lens arrangement shown in FIG. 1. Table 1 shows the numerical data of the first embodiment.

In the first embodiment, the positive second-sub-lens group 12 includes a positive lens element 16 and a negative lens element 17, which are cemented to each other, in this order from the object.

The diaphragm S is provided 3.72 behind surface No. 9 (the positive second-sub-lens group 12).

TABLE 1

| F = 1:1.4 | f = 8.24 | m = −0.031 | fB = 9.80 | OD = 250 |
|---|---|---|---|---|
| Surf. No. | r | d | Nd | ν |
| 1 | 29.944 | 1.50 | 1.77250 | 49.6 |
| 2 | 10.452 | 4.63 | — | — |
| 3 | 87.837 | 2.78 | 1.80518 | 25.4 |
| 4 | −42.638 | 0.10 | — | — |
| 5 | 38.544 | 1.20 | 1.77250 | 49.6 |
| 6 | 10.806 | 6.17 | — | — |
| 7 | 37.244 | 8.01 | 1.80440 | 39.6 |
| 8 | −9.598 | 1.00 | 1.84666 | 23.8 |
| 9 | −15.388 | 8.12 | — | — |
| 10 | −8.302 | 1.00 | 1.66680 | 33.0 |
| 11 | 15.113 | 6.82 | 1.77250 | 49.6 |
| 12 | −13.982 | 0.10 | — | — |
| 13 | 72.345 | 1.00 | 1.84666 | 23.8 |
| 14 | 16.246 | 1.40 | — | — |
| 15 | 113.193 | 3.33 | 1.61800 | 63.4 |
| 16 | −20.498 | 0.10 | — | — |
| 17 | 16.477 | 4.00 | 1.77250 | 49.6 |
| 18 | −218.833 | 1.50 | — | — |
| 19 | ∞ | 0.75 | 1.51633 | 64.1 |
| 20 | ∞ | — | — | — |

[Embodiment 2]

FIG. 3 is the lens arrangement of the wide-angle lens system according to the second embodiment of the present invention. FIGS. 4A through 4E show aberrations occurred in the lens arrangement shown in FIG. 3. Table 2 shows the numerical data of the second embodiment.

The basic lens arrangement of the second embodiment is the same as that of the first embodiment.

The diaphragm S is provided 3.43 behind surface No. 9 (the positive second-sub-lens group 12).

TABLE 2

| F = 1:1.4 | f = 8.24 | m = −0.031 | fB = 9.81 | OD = 250 |
|---|---|---|---|---|
| Surf. No. | r | d | Nd | ν |
| 1 | 26.321 | 1.50 | 1.77250 | 49.6 |
| 2 | 10.859 | 4.42 | — | — |
| 3 | 90.564 | 4.72 | 1.84666 | 23.8 |
| 4 | −48.823 | 0.34 | — | — |
| 5 | 26.887 | 1.00 | 1.81600 | 46.6 |
| 6 | 8.758 | 5.07 | — | — |
| 7 | 34.492 | 10.24 | 1.80610 | 40.9 |
| 8 | −8.732 | 1.00 | 1.84666 | 23.8 |
| 9 | −13.773 | 7.88 | — | — |
| 10 | −8.046 | 1.00 | 1.67270 | 32.1 |
| 11 | 204.499 | 6.82 | 1.77250 | 49.6 |
| 12 | −12.533 | 0.10 | — | — |
| 13 | 193.274 | 1.00 | 1.84666 | 23.8 |
| 14 | 17.163 | 0.96 | — | — |
| 15 | 52.008 | 3.26 | 1.61800 | 63.4 |
| 16 | −23.889 | 0.56 | — | — |
| 17 | 16.599 | 3.65 | 1.77250 | 49.6 |
| 18 | −149.938 | 1.50 | — | — |
| 19 | ∞ | 0.75 | 1.51633 | 64.1 |
| 20 | ∞ | — | — | — |

[Embodiment 3]

FIG. 5 is the lens arrangement of the wide-angle lens system according to the third embodiment of the present invention. FIGS. 6A through 6E show aberrations occurred in the lens arrangement shown in FIG. 5. Table 3 shows the numerical data of the third embodiment.

The basic lens arrangement of the third embodiment is the same as that of the first embodiment.

The diaphragm S is provided 3.36 behind surface No. 9 (the positive second-sub-lens group 12).

TABLE 3

| F = 1:1.4 | f = 8.24 | m = −0.031 | fB = 9.80 | OD = 250 |
|---|---|---|---|---|
| Surf. No. | r | d | Nd | ν |
| 1 | 31.514 | 1.53 | 1.77250 | 49.6 |
| 2 | 10.902 | 4.55 | — | — |
| 3 | 102.280 | 2.77 | 1.80518 | 25.4 |
| 4 | −43.350 | 0.10 | — | — |
| 5 | 33.500 | 1.48 | 1.77250 | 49.6 |
| 6 | 10.968 | 6.53 | — | — |
| 7 | 43.580 | 8.01 | 1.80440 | 39.6 |
| 8 | −10.075 | 1.04 | 1.84666 | 23.8 |
| 9 | −15.658 | 8.25 | — | — |
| 10 | −8.369 | 1.00 | 1.66680 | 33.0 |
| 11 | 14.000 | 6.72 | 1.77250 | 49.6 |
| 12 | −14.248 | 0.11 | — | — |
| 13 | 69.320 | 1.00 | 1.84666 | 23.8 |
| 14 | 16.256 | 1.44 | — | — |
| 15 | 152.240 | 3.34 | 1.61800 | 63.4 |
| 16 | −19.850 | 0.10 | — | — |
| 17 | 16.331 | 4.18 | 1.77250 | 49.6 |
| 18 | −184.409 | 1.50 | — | — |
| 19 | ∞ | 0.75 | 1.51633 | 64.1 |
| 20 | ∞ | — | — | — |

[Embodiment 4]

Figure 7:
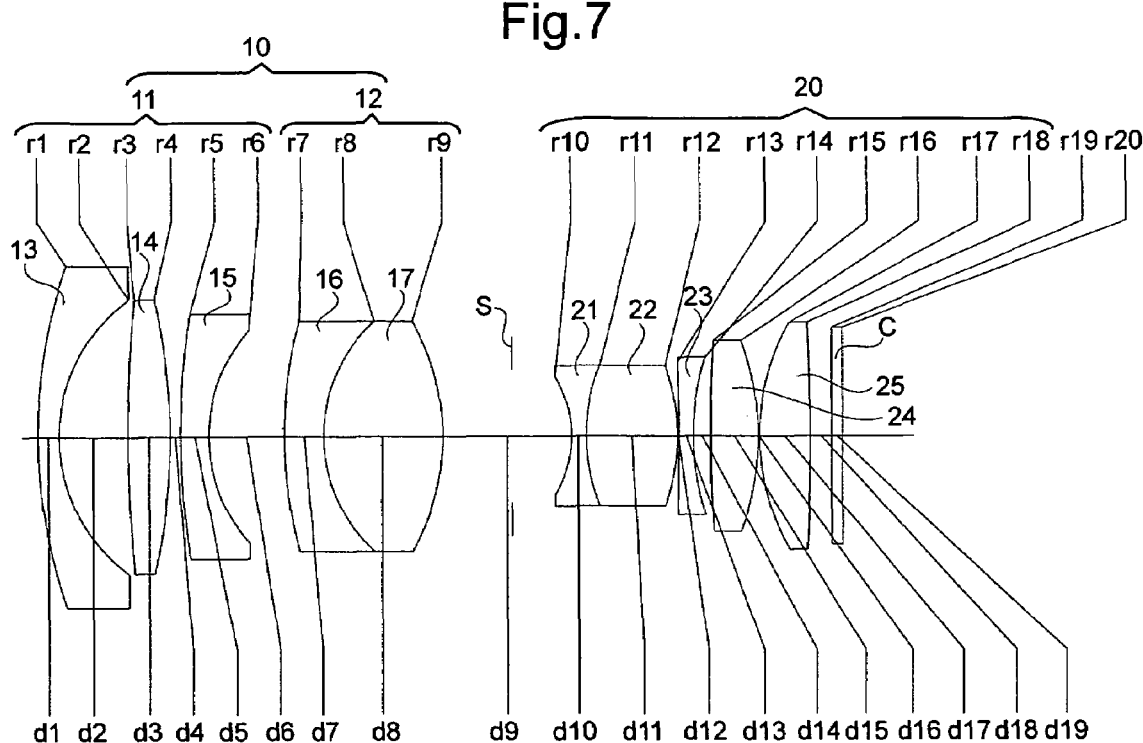
FIG. 7 is a lens arrangement of the wide-angle lens system according to a fourth embodiment of the present invention.
Figure 8A:
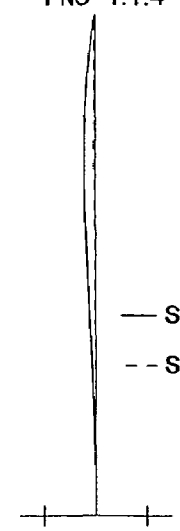
FIGS. 8A, 8B, 8C, 8D and 8E show aberrations occurred in the lens arrangement shown in FIG. 7.
Figure 8B:
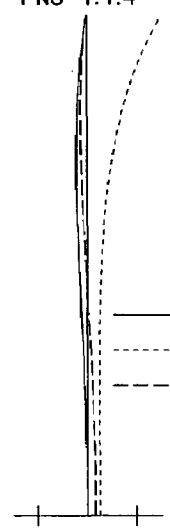
Figure 8C:
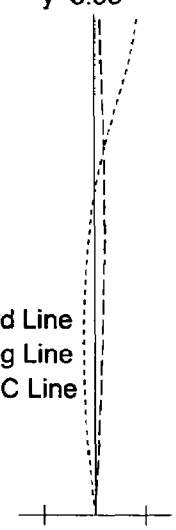
Figure 8D:
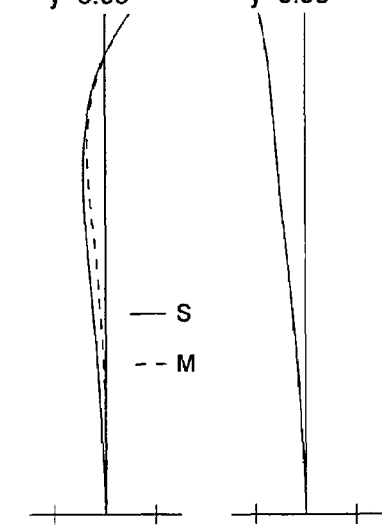
Figure 8E:
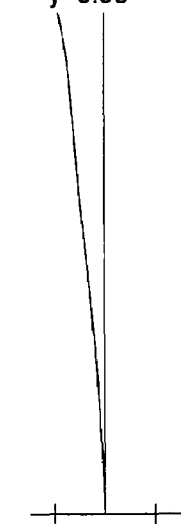

FIG. 7 is the lens arrangement of the wide-angle lens system according to the fourth embodiment of the present invention. FIGS. 8A through 8E show aberrations occurred in the lens arrangement shown in FIG. 7. Table 4 shows the numerical data of the fourth embodiment.

Unlike the first to third embodiments, the positive second-sub-lens group 12 is constituted by a negative lens element 16 and a positive lens element 17, which are cemented to each other, in this order from the object.

Except the lens arrangement of the positive second-sub-lens group 12, the basic lens arrangement of the fourth embodiment is the same as that of the first embodiment.

The diaphragm S is provided 4.74 behind surface No. 9 (the positive second-sub-lens group 12).

TABLE 4

F = 1:1.4   f = 8.24   m = −0.031   fB = 9.81   OD = 250

| Surf. No. | r | d | Nd | ν |
|---|---|---|---|---|
| 1 | 35.883 | 1.50 | 1.80400 | 46.6 |
| 2 | 11.983 | 4.77 | — | — |
| 3 | 103.021 | 2.86 | 1.84666 | 23.8 |
| 4 | −44.561 | 0.75 | — | — |
| 5 | 56.033 | 1.91 | 1.77250 | 49.6 |
| 6 | 11.249 | 5.23 | — | — |
| 7 | 30.793 | 2.77 | 1.80518 | 25.4 |
| 8 | 10.823 | 8.28 | 1.80440 | 39.6 |
| 9 | −16.854 | 8.84 | — | — |
| 10 | −8.411 | 1.00 | 1.64769 | 33.8 |
| 11 | 12.738 | 6.37 | 1.77250 | 49.6 |
| 12 | −15.280 | 0.10 | — | — |
| 13 | −215.261 | 1.00 | 1.84666 | 23.8 |
| 14 | 18.113 | 1.20 | — | — |
| 15 | 112.470 | 3.27 | 1.77250 | 49.6 |
| 16 | −19.711 | 0.10 | — | — |
| 17 | 16.138 | 3.53 | 1.77250 | 49.6 |
| 18 | −164.421 | 1.50 | — | — |
| 19 | ∞ | 0.75 | 1.51633 | 64.1 |
| 20 | ∞ | — | — | — |

[Embodiment 5]

FIG. 9 is the lens arrangement of the wide-angle lens system according to the fifth embodiment of the present invention. FIGS. 10A through 10E show aberrations occurred in the lens arrangement shown in FIG. 9. Table 5 shows the numerical data of the fifth embodiment.

The basic lens arrangement of the fifth embodiment is the same as that of the fourth embodiment.

The diaphragm S is provided 3.72 behind surface No. 9 (the positive second-sub-lens group 12).

TABLE 5

F = 1:1.4   f = 8.24   m = −0.031   fB = 9.81   OD = 250

| Surf. No. | r | d | Nd | ν |
|---|---|---|---|---|
| 1 | 61.901 | 1.50 | 1.77250 | 49.6 |
| 2 | 13.205 | 4.26 | — | — |
| 3 | 121.803 | 4.80 | 1.84666 | 23.8 |
| 4 | −36.864 | 2.73 | — | — |
| 5 | 38.333 | 1.75 | 1.81600 | 46.6 |
| 6 | 9.763 | 5.68 | — | — |
| 7 | 19.658 | 1.00 | 1.84666 | 23.8 |
| 8 | 10.795 | 6.30 | 1.72000 | 43.7 |
| 9 | −15.071 | 8.17 | — | — |
| 10 | −7.664 | 1.00 | 1.67270 | 32.1 |
| 11 | −179.325 | 6.49 | 1.77250 | 49.6 |
| 12 | −12.053 | 0.10 | — | — |
| 13 | 192.826 | 1.00 | 1.84666 | 23.8 |
| 14 | 17.710 | 1.08 | — | — |
| 15 | 77.386 | 3.35 | 1.61800 | 63.4 |
| 16 | −21.137 | 0.10 | — | — |
| 17 | 16.978 | 5.08 | 1.77250 | 49.6 |
| 18 | −132.890 | 1.50 | — | — |
| 19 | ∞ | 0.75 | 1.51633 | 64.1 |
| 20 | ∞ | — | — | — |

[Embodiment 6]

FIG. 11 is the lens arrangement of the wide-angle lens system according to the sixth embodiment of the present invention. FIGS. 12A through 12E show aberrations occurred in the lens arrangement shown in FIG. 11. Table 6 shows the numerical data of the sixth embodiment.

The basic lens arrangement of the sixth embodiment is the same as that of the fourth embodiment.

The diaphragm S is provided 3.67 behind surface No. 9 (the positive second-sub-lens group 12).

TABLE 6

F = 1:1.4   f = 8.24   m = −0.031   fB = 9.81   OD = 250

| Surf. No. | r | d | Nd | ν |
|---|---|---|---|---|
| 1 | 43.537 | 1.50 | 1.80400 | 46.6 |
| 2 | 12.507 | 4.20 | — | — |
| 3 | 87.408 | 4.33 | 1.84666 | 23.8 |
| 4 | −40.490 | 2.96 | — | — |
| 5 | 39.135 | 1.00 | 1.81600 | 46.6 |
| 6 | 9.466 | 5.28 | — | — |
| 7 | 19.560 | 1.00 | 1.80518 | 25.4 |
| 8 | 10.120 | 6.55 | 1.72000 | 43.7 |
| 9 | −14.587 | 8.12 | — | — |
| 10 | −7.375 | 1.00 | 1.67270 | 32.1 |
| 11 | 266.274 | 5.82 | 1.77250 | 49.6 |
| 12 | −11.482 | 0.10 | — | — |
| 13 | 195.964 | 1.00 | 1.84666 | 23.8 |
| 14 | 17.093 | 1.09 | — | — |
| 15 | 79.909 | 3.34 | 1.61800 | 63.4 |
| 16 | −20.550 | 0.10 | — | — |
| 17 | 16.344 | 4.25 | 1.77250 | 49.6 |
| 18 | −140.307 | 1.50 | — | — |
| 19 | ∞ | 0.75 | 1.51633 | 64.1 |
| 20 | ∞ | — | — | — |

Table 7 shows the numerical data of each condition for each embodiment.

TABLE 7

| | Embod. 1 | Embod. 2 | Embod. 3 | Embod. 4 | Embod. 5 | Embod. 6 |
|---|---|---|---|---|---|---|
| Cond. (1) | 0.632 | 0.690 | 0.579 | 0.643 | 0.719 | 0.738 |
| Cond. (2) | 0.884 | 0.860 | 0.908 | 0.847 | 0.834 | 0.837 |
| Cond. (3) | 0.453 | 0.507 | 0.445 | 0.393 | 0.394 | 0.407 |
| Cond. (4) | 1.988 | 2.070 | 2.059 | 2.067 | 2.515 | 2.337 |
| Cond. (5) | 0.314 | 0.312 | 0.299 | 0.428 | 0.326 | 0.341 |
| Cond. (6) | 15.8 | 17.1 | 15.8 | 14.2 | 19.9 | 19.9 |

As can be understood from Table 7, the first through sixth embodiments satisfy conditions (1) through (6), and as can be understood from the aberration diagrams, the various aberrations (especially distortion and astigmatism) have been relatively well corrected, so that the wide-angle lens system of the present invention is suitable for use in high definition image processing of finite objects.

According to the present invention, a wide-angle lens system with the following features can be achieved:

a large aperture with an f-number of approximately 1.4; and being able to examine an object at a finite distance with higher definition, and to process an image.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle lens system comprises a positive front lens group, a diaphragm, and a positive rear lens group, in this order from an object,
wherein said front lens group comprises a negative first-sub-lens group and a positive second-sub-lens group, in this order from the object;
wherein said negative first-sub-lens group comprises a negative lens element, a positive lens element, and a negative lens element, in this order from the object; and
wherein said front lens group satisfies the following conditions:

$$0.5 < f/|f_{1a}| < 0.75$$

$$0.5 < |f_{1a}|/f_{1b} < 1.0$$

$$0.35 < f/f_{1bi} < 0.6$$

wherein
f designates the focal length of the entire lens system;
$f_{1a}$ designates the focal length of said negative first-sub-lens group ($f_{1a}<0$);
$f_{1b}$ designates the focal length of said positive second-sub-lens group ($f_{1b}>0$);
$f_{1bi}$ designates the focal length of the most image-side surface of said positive second-sub-lens group ($f_{1bi}=r_{1bi}/(1-N_{1bi})$);
$r_{1bi}$ designates the radius of curvature of the most image-side surface of said positive second-sub-lens group ($r_{1bi}<0$); and
$N_{1bi}$ designates a refractive index of the most image-side lens element of said positive second-sub-lens group.

2. The wide-angle lens system according to claim 1, further satisfying the following condition:

$$1.7 < d_{1a-1b}/f < 3.0$$

wherein
$d_{1a-1b}$ designates the distance from the most object-side surface of said negative first-sub-lens group to the most object-side surface of said positive second-sub-lens group; and
f designates the focal length of the entire lens system.

3. The wide-angle lens system according to claim 1, wherein said positive second-sub-lens group comprises a positive lens element and a negative lens element, or, a negative lens element and a positive lens element, which are cemented to each other, in this order from the object; and
wherein said positive second-sub-lens group satisfies the following conditions:

$$0.25 < f_{1bp}/|f_{1bn}| < 0.5$$

$$10 < v_{1bp} - v_{1bn} < 30$$

wherein
$f_{1bp}$ designates the focal length of said positive lens element in said positive second-sub-lens group;
$f_{1bn}$ designates the focal length of said negative lens element in said positive second-sub-lens group;
$v_{1bp}$ designates the Abbe number of said positive lens element in said positive second-sub-lens group; and
$v_{1bn}$ designates the Abbe number of said negative lens element in said positive second-sub-lens group.

4. The wide-angle lens system according to claim 1, wherein focusing is performed by advancing the entire lens system.

* * * * *